(12) United States Patent
Takaike

(10) Patent No.: US 10,680,670 B2
(45) Date of Patent: Jun. 9, 2020

(54) RECEIVING APPARATUS AND RECEIVING METHOD

(71) Applicant: SONY SEMICONDUCTOR SOLUTIONS CORPORATION, Kanagawa (JP)

(72) Inventor: Yoshihisa Takaike, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/336,365

(22) PCT Filed: Aug. 23, 2017

(86) PCT No.: PCT/JP2017/030088
§ 371 (c)(1),
(2) Date: Mar. 25, 2019

(87) PCT Pub. No.: WO2018/092373
PCT Pub. Date: May 24, 2018

(65) Prior Publication Data
US 2019/0288723 A1 Sep. 19, 2019

(30) Foreign Application Priority Data
Nov. 21, 2016 (JP) .................................. 2016-225880

(51) Int. Cl.
*H04B 1/12* (2006.01)
*H04B 1/10* (2006.01)
(Continued)

(52) U.S. Cl.
CPC ................. *H04B 1/12* (2013.01); *H04B 1/10* (2013.01); *H04B 1/1027* (2013.01); *H04N 21/426* (2013.01); *H04N 21/4425* (2013.01)

(58) Field of Classification Search
CPC ............................... H04B 1/12; H04B 1/1027
See application file for complete search history.

(56) References Cited

U.S. PATENT DOCUMENTS

2003/0133049 A1* 7/2003 Cowley ................. H03D 7/163
348/731
2011/0129047 A1 6/2011 Mashino et al.
(Continued)

FOREIGN PATENT DOCUMENTS

CN 102100023 A 6/2011
EP 2288061 A1 2/2011
(Continued)

OTHER PUBLICATIONS

International Search Report and Written Opinion of PCT Application No. PCT/JP2017/030088, dated Nov. 7, 2017, 6 pages of ISRWO.

*Primary Examiner* — Nguyen T Vo
(74) *Attorney, Agent, or Firm* — Chip Law Group

(57) ABSTRACT

In a receiving apparatus configured to receive a plurality of broadcasts, a disturbing signal is attenuated. The receiving apparatus includes a first filter, a second filter, a detector, and a selector. The first filter allows a received signal to pass in a first passband. The second filter allows a received signal to pass in a second passband having a band partly overlapping with that of the first passband. The detector detects a disturbing signal included in the received signal passed through one of the first filter or the second filter. The selector selects one of the first filter or the second filter according to a signal level of the detected disturbing signal. The signal processing section performs processing on the received signal passed through the selected filter.

6 Claims, 9 Drawing Sheets

(51) Int. Cl.
*H04N 21/4425* (2011.01)
*H04N 21/426* (2011.01)

(56) References Cited

U.S. PATENT DOCUMENTS

| | | | | |
|---|---|---|---|---|
| 2012/0057621 A1* | 3/2012 | Hong | ............... | H04B 7/0871 |
| | | | | 375/219 |
| 2013/0142295 A1* | 6/2013 | Badke | ............... | H04B 15/00 |
| | | | | 375/350 |
| 2020/0036406 A1* | 1/2020 | Pehlke | ............... | H04B 1/40 |

FOREIGN PATENT DOCUMENTS

| | | |
|---|---|---|
| JP | 2010-016785 A | 1/2010 |
| JP | 2013-236196 A | 11/2013 |
| JP | 2015-115796 A | 6/2015 |
| KR | 10-2011-0017006 A | 2/2011 |
| WO | 2010/010936 A1 | 1/2010 |

\* cited by examiner

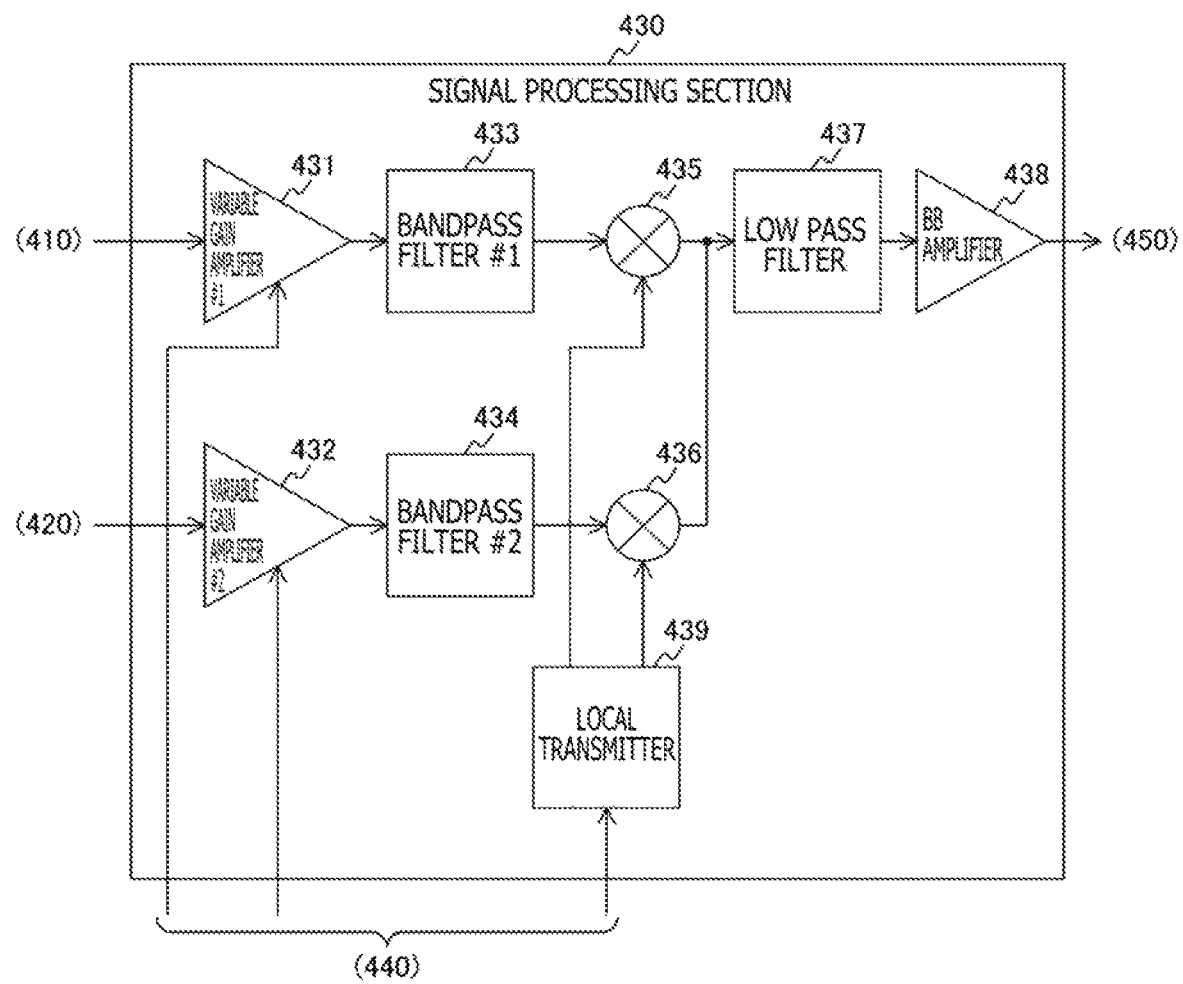

RECEIVING APPARATUS AND RECEIVING METHOD

CROSS REFERENCE TO RELATED APPLICATIONS

This application is a U.S. National Phase of International Patent Application No. PCT/JP2017/030088 filed on Aug. 23, 2017, which claims priority benefit of Japanese Patent Application No. JP 2016-225880 filed in the Japan Patent Office on Nov. 21, 2016. Each of the above-referenced applications is hereby incorporated herein by reference in its entirety.

TECHNICAL FIELD

The present technique relates to a receiving apparatus and a receiving method. Specifically, the present technique relates to a receiving apparatus and a receiving method for receiving a plurality of broadcasts.

BACKGROUND ART

In the related art, in order to cover a plurality of broadcasts having different bands, a receiving apparatus including a high-frequency signal processing section, which is configured to generate a signal having a baseband frequency from a received high-frequency signal, for each band is used. Here, the high-frequency signal processing section corresponds to a high-frequency amplifier configured to amplify a high-frequency signal, a filter configured to filter out a noise, a mixer configured to convert a high-frequency signal into a signal having a baseband frequency by mixing local outgoing signals, and the like. As an example of the receiving apparatus as described above, for example, a receiving apparatus including filters and high-frequency signal processing sections corresponding to each of terrestrial broadcasts and satellite broadcasts, and a local transmitter configured to supply local outgoing signals to these high-frequency signal processing sections is proposed (for example, see PTL 1). In this receiving apparatus, signals having unnecessary bands out of the terrestrial broadcasts and the satellite broadcasts are attenuated by the filters.

CITATION LIST

Patent Literature

[PTL 1]
Japanese Patent Laid-open No. 2013-236196

SUMMARY

Technical Problem

The related art described above has the following problem. In a case where a filter is arranged upstream of a high-frequency signal processing section and the frequency of a disturbing signal is included in a passband of the filter, the filter cannot attenuate the disturbing signal, which may lower a reception performance.

In view of such circumstances, it is an object of the present technique to improve a reception performance by attenuating a disturbing signal in a receiving apparatus configured to receive a plurality of broadcasts.

Solution to Problem

In order to solve the above-described problem, a first aspect of the present technique is a receiving apparatus including: a first filter configured to allow a received signal to pass in a first passband; a second filter configured to allow a received signal to pass in a second passband having a band partly overlapping with that of the first passband; a detector configured to detect a disturbing signal included in the received signal passed through one of the first filter or the second filter; a selector configured to select one of the first filter or the second filter according to a signal level of the detected disturbing signal; and a signal processing section configured to perform processing on the received signal passed through the selected filter, and a receiving method. This brings an effect that one of the two filters having the bands partly overlapping with each other is selected based on the detected disturbing signal.

Also, in the first aspect, the detector may detect the received signal having a signal level larger than a predetermined threshold value as the disturbing signal. This brings an effect that the disturbing signal is detected based on the predetermined threshold value.

In addition, in the first aspect, the detector may detect the disturbing signal included in the received signal after the processing. This brings an effect that the disturbing signal included in the received signal after the processing is detected.

In addition, in the first aspect, the signal processing section may perform frequency conversion of the received signal as the processing. This brings an effect that the frequency conversion of the received signal is performed.

Advantageous Effect of Invention

According to the present technique, a superior advantageous effect that a reception performance is improved by attenuating a disturbing signal may be achieved in a receiving apparatus configured to receive a plurality of broadcasts. Note that the advantageous effect described here is not intended to limit the disclosure, and any advantageous effect described in this specification is applicable.

BRIEF DESCRIPTION OF DRAWINGS

FIG. 2 is a diagram illustrating a configuration example of a signal processing section 430 according to the embodiment of the present technique.

DESCRIPTION OF EMBODIMENTS

Modes for carrying out the present technique (hereinafter, referred to as embodiments) will be described. The description will be given in conformance with the following order.

1. First Embodiment (an example of a case where a disturbing signal is detected from a received signal after demodulating)
2. Second Embodiment (an example of a case where a disturbing signal is detected from a received high-frequency signal).

1. First Embodiment

Configuration of Receiving Apparatus

Figure 1:
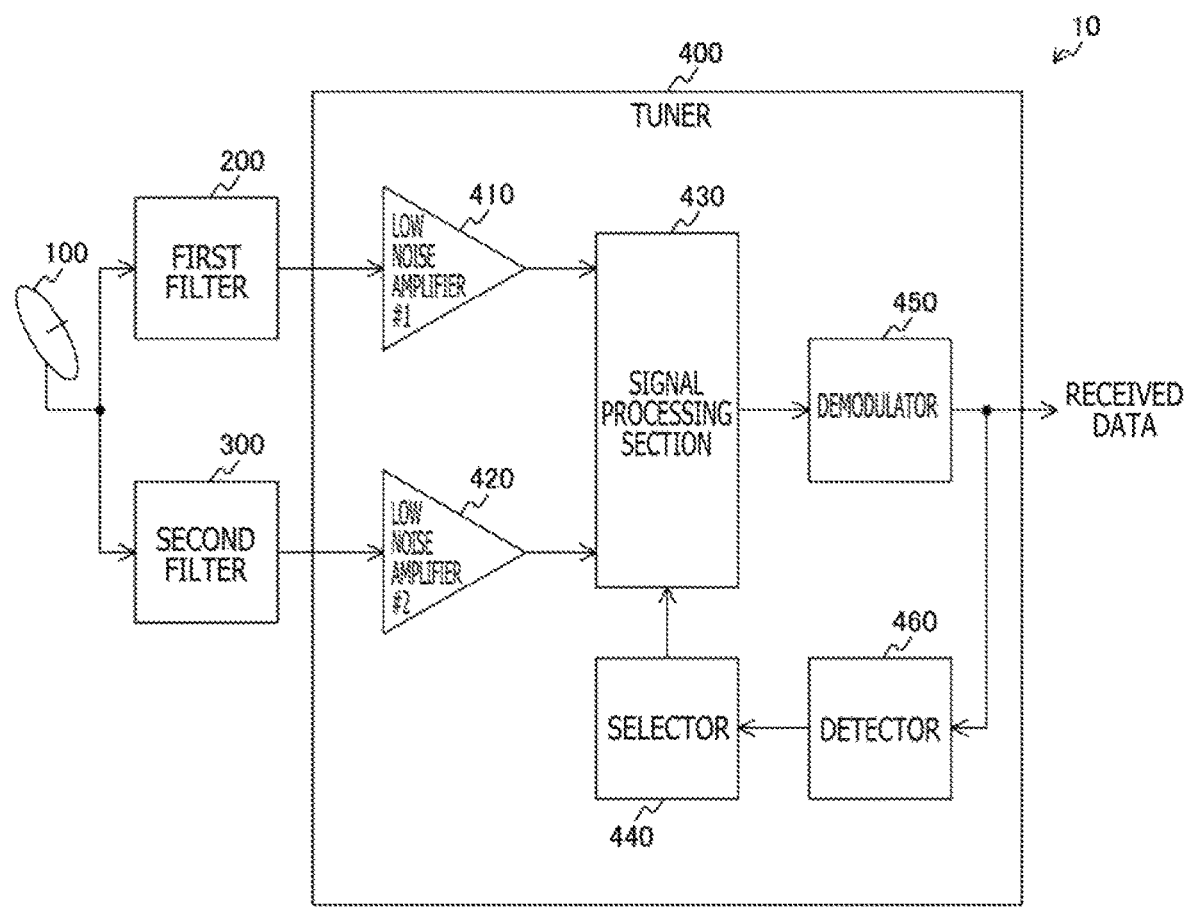
FIG. 1 is a diagram illustrating a configuration example of a receiving apparatus 10 according to a first embodiment of the present technique.

FIG. 1 is a diagram illustrating a configuration example of a receiving apparatus 10 according to a first embodiment of the present technique. The receiving apparatus 10 includes an antenna 100, a first filter 200, a second filter 300, and a tuner 400.

The antenna 100 coverts an electric wave into a high-frequency signal and outputs the same. The antenna 100 receives a broadband electric wave and converts the electric wave into a high-frequency signal for covering increase in amount of data and a large number of channels or the like in television broadcasts.

The first filter 200 and the second filter 300 allow a signal in a passband to pass through among high-frequency signals output from the antenna 100 to attenuate a signal within a blocking region. The first filter 200 and the second filter 300 allow high-frequency signals to pass in a first passband and a second passband, respectively. The first passband and the second passband correspond, for example, to a low band, which is a low-frequency band, and a high band, which is a high-frequency band. A broadband high-frequency signal, which is output from the antenna 100, is divided into two bands by the first filter 200 and the second filter 300, and the divided signals are each output to the tuner 400. In the tuner 400, which will be described later, signal processing may be performed for each band, and thus a signal processing section having a narrow bandwidth can be used. Therefore, the range of choice can be improved. Examples of the first filter 200 and the second filter 300 that can be used include a diplexer.

Also, the first passband and the second passband have bands partly overlap with each other. The overlapping band corresponds to, for example, an overlapping band in a range in which a gain is lowered by 3 dB from 0 dB. For example, assuming that the first passband is from 950 MHz to 2.15 GHz and the second passband is from 2.00 GHz to 3.22 GHz, the overlapping band is a frequency domain from 2.00 GHz to 2.15 GHz.

The tuner 400 generates incoming data by performing signal processing on the high-frequency signal output from the first filter 200 and the second filter 300 and outputs the incoming data. The incoming data corresponds to signals of broadcasted images and sounds. The generated incoming data is supplied to outside of the receiving apparatus 10 as output data from the receiving apparatus 10. The tuner 400 includes a low noise amplifier #1 (410) and a low noise amplifier #2 (420), a signal processing section 430, a demodulator 450, a detector 460, and a selector 440.

The low noise amplifiers #1 (410) and #2 (420) amplify high-frequency signals output from the first filter 200 and the second filter 300, respectively. The low noise amplifiers #1 (410) and #2 (420) have bands corresponding to the first passband and the second passband, respectively, and output the amplified high-frequency signals to the signal processing section 430. Also, the low noise amplifiers #1 (410) and #2 (420) are amplifiers generating less noise. By arranging the low noise amplifiers #1 (410) and #2 (420) at an initial stage of the tuner 400, signal noise ratio (SNR) in the tuner 400 can be improved.

The signal processing section 430 performs signal processing for the high-frequency signals output from the low noise amplifiers #1 (410) and #2 (420). The signal processing section 430 performs down conversion, which converts a high-frequency signal into a baseband frequency, as signal processing and outputs the down-converted signal to the demodulator 450. The signal processing section 430 performs signal processing for one of an output from the low noise amplifier #1 (410) or an output from the low noise amplifier #2 (420). This is performed based on a selection by the selector 440. The configuration of the signal processing section 430 will be described later in detail.

The demodulator 450 demodulates a signal output from the signal processing section 430 and having a baseband frequency. The demodulator 430 performs analog-digital conversion for the signal having the baseband frequency, generates a digital received signal, and demodulates the generated digital received signal. Also, in a case where a demodulated received signal is encoded, the demodulator 450 further performs decoding and generates incoming data.

The detector 460 detects a disturbing signal from the incoming data output from the demodulator 450. The detector 460 is able to detect the disturbing signal by detecting the SNR in the incoming data after demodulation. The SNR can be acquired by calculating, for example, an error vector amplitude. In a case where the SNR is lower than a predetermined threshold value, it is possible to determine that a disturbing signal is detected.

The selector 440 selects a low band or a high band according to a result of the disturbing signal detection by the detector 460. Specifically, the selector 440 selects any one of the first filter 200 or the second filter 300 according to a signal level of the detected disturbing signal. This selection can be achieved by causing the signal processing section 430 to select an output from one of the low noise amplifier #1 (410) or the low noise amplifier #2 (420).

The tuner 400 can be formed, for example, into a semiconductor chip. In this case, the first filter 200 and the second filter 300 can be used as external filters of the tuner 400. Alternatively, the first filter 200, the second filter 300, and the tuner 400 can be formed on a single semiconductor chip. Further, the configuration of the receiving apparatus 10 is not limited to this example. For example, it is also possible to omit the detector 460 and detect a disturbing signal by a microcomputer or the like disposed externally of the tuner 400. It is also possible to connect a signal cable instead of the antenna 100, and receive a signal transmitted by a cable broadcast.

Configuration of Signal Processing Section

FIG. 2 is a diagram illustrating a configuration example of the signal processing section 430 according to the embodiment of the present technique. The signal processing section 430 includes a variable gain amplifier #1 (431) and a variable gain amplifier #2 (432), a bandpass filter #1 (433)

and a bandpass filter #2 (434), a mixer 435 and a mixer 436, a low pass filter 437, a baseband (BB) amplifier 438, and a local transmitter 439.

The variable gain amplifiers #1 (431) and #2 (432) are configured to amplify the high-frequency signals output from the low noise amplifiers #1 (410) and #2 (420). In the variable gain amplifiers #1 (431) and #2 (432), the gain is automatically adjusted such that the high-frequency signals output therefrom have a predetermined signal level. Also, the variable gain amplifiers #1 (431) and #2 (432) have bands corresponding to the first passband and the second passband, respectively, and output high-frequency signals after amplification to the bandpass filters #1 (433) and #2 (434), respectively. Also, one of the variable gain amplifiers #1 (431) and #2 (432) is selected by the selector 440 and amplification of the high-frequency signal is performed.

The bandpass filters #1 (433) and #2 (434) are filters having passbands corresponding to the first passband and the second passband, respectively.

The local transmitter 439 generates local outgoing signals. The local transmitter 439 generates a local outgoing signal corresponding to a band selected by the selector 440 and outputs the generated signal to the mixer 435 or 436. Examples of the local transmitter 439 that can be used include a transmitting circuit that uses a PLL (Phase Locked Loop).

The mixers 435 and 436 mix a local outgoing signal output from the local transmitter 439 and a high-frequency signal that has passed through the bandpass filter #1 (433) or #2 (434). The mixers 435 and 436 convert a high-frequency signal into a baseband signal by mixing the local outgoing signal and the high-frequency signal. The mixer 435 converts a high-frequency signal output from the bandpass filter #1 (433), and the mixer 436 converts a high-frequency signal output from the bandpass filter #2 (434). The baseband signal after conversion is output to the low pass filter 437.

The low pass filter 437 is a filter that allows the baseband signal to pass therethrough and attenuates the high-frequency signal.

The baseband amplifier 438 amplifies a baseband signal that has passed through the low pass filter 437. The baseband signal after amplification is output to the demodulator 450.

Operation of First Filter and Second Filter

Figure 3A:
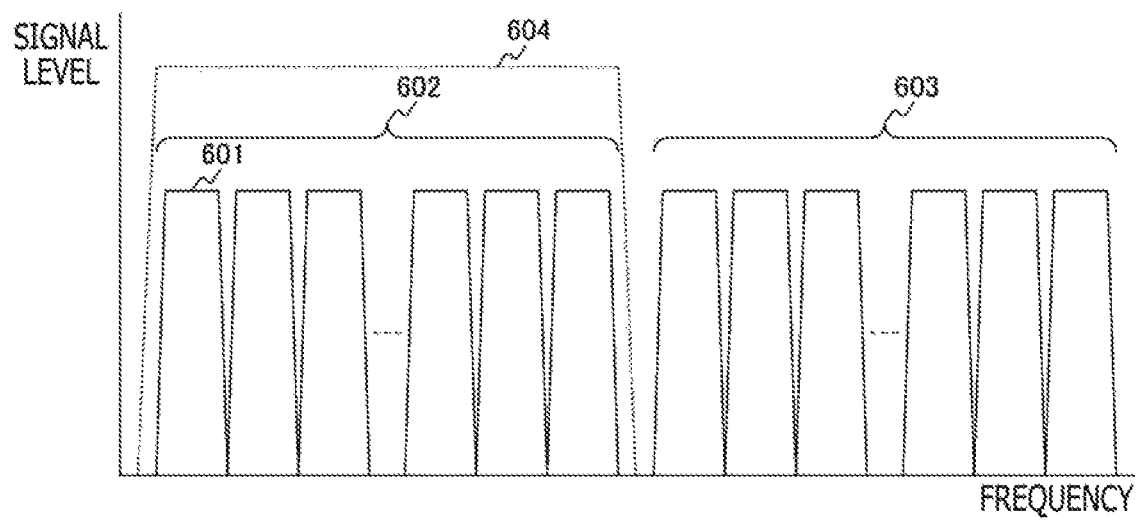
FIGS. 3A and 3B illustrate graphs indicating an example of an operation of a first filter 200 according to the embodiment of the present technique.
Figure 3B:
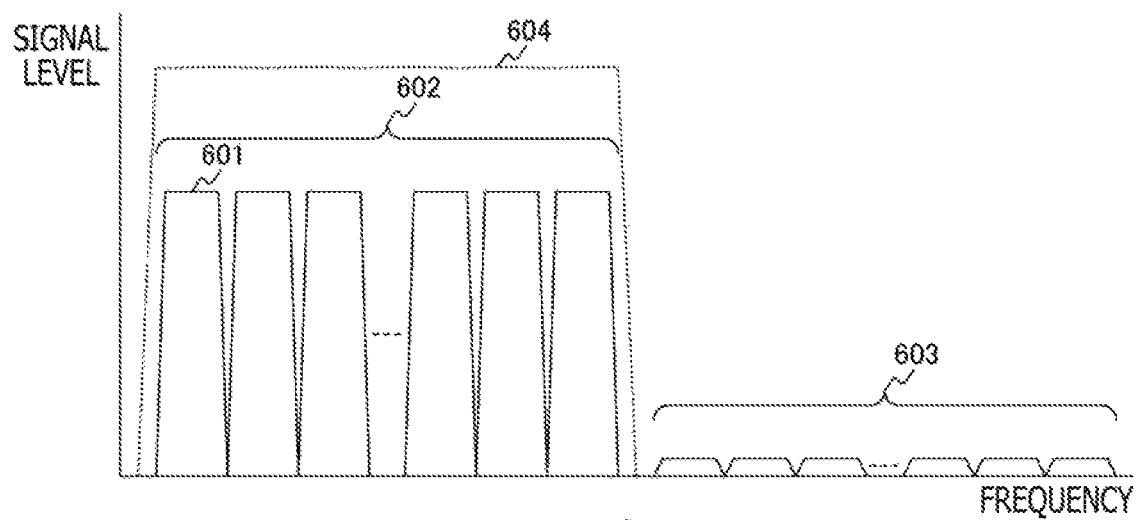

FIGS. 3A and 3B illustrate graphs indicating an example of an operation of the first filter 200 according to the embodiment of the present technique. In the figure, the abscissa axis represents a frequency, and the ordinate axis represents a signal level. Also, in the figure, a signal band 602 represents a band of desired signals. The signal band 602 includes signals 601 of a plurality of channels. A dotted line in the figure indicates a passband (first passband) 604 of the first filter 200. Meanwhile, a signal band 603 represents a band of unnecessary signals, and represents signals having a higher frequency than the first passband. In the figure, "a" indicates signals input to the first filter 200, and "b" indicates a state of output signals corresponding to these inputs. As illustrated in the figure, the signals included in the passband of the first filter 200 pass without attenuation, and the signals that are not included in the passband of the first filter 200 are attenuated. Note that in the second filter 300, the signals not included in the passband are similarly attenuated. In this manner, the SNR in the receiving apparatus 10 can be improved by attenuating unnecessary signals such as disturbing signals.

First Passband and Second Passband

Figure 4A:
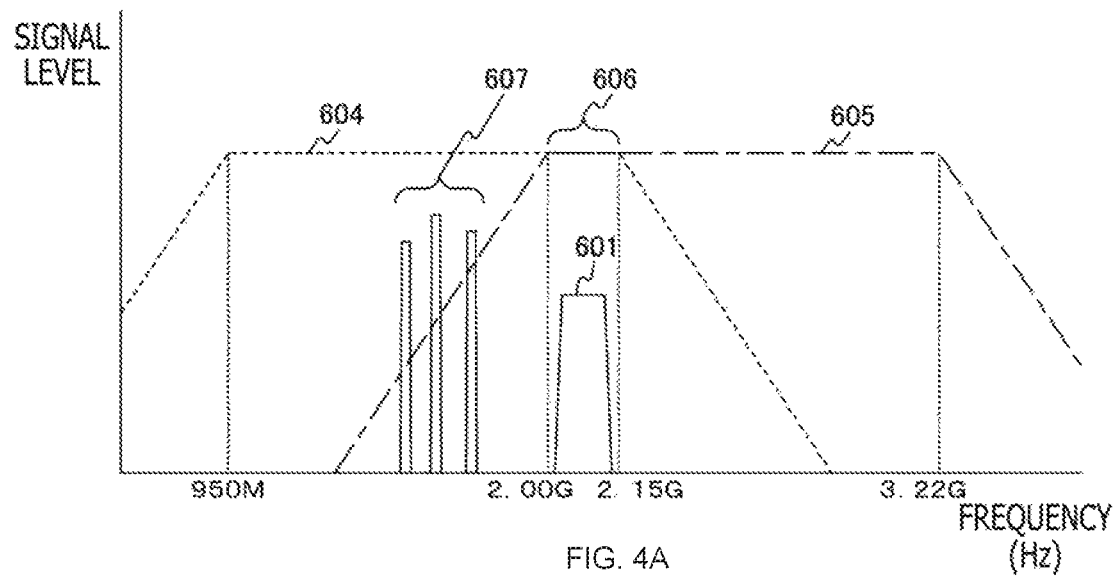
FIGS. 4A and 4B illustrate graphs illustrating an example of passbands of the first filter 200 and a second filter 300 according to the embodiment of the present technique.
Figure 4B:
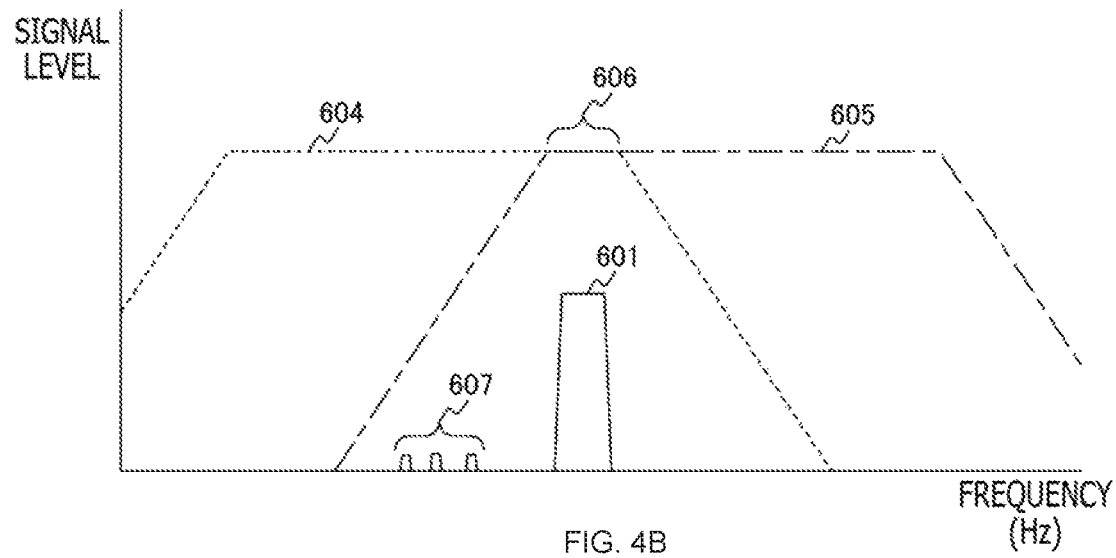

FIGS. 4A and 4B illustrate graphs indicating an example of passbands of the first filter 200 and the second filter 300 according to the embodiment of the present technique. Similarly to FIGS. 3A and 3B, the abscissa axis represents a frequency, and the ordinate axis represents a signal level. Also, in the figure, a dotted line represents the first passband 604 in the first filter 200, and a one-dot chain line represents a second passband 605 in the second filter 300. As described above, the first passband is a frequency domain from 950 MHz to 2.15 GHz, and the second passband is a frequency domain from 2.00 GHz to 3.22 GHz. A region 606 (2.00 GHz to 2.15 GHz) is a frequency domain in which these passbands overlap with each other. In a case where a signal 601 of a channel included in the overlapped region 606 is received, the signal can be received irrespective of which one of the first filter 200 and the second filter 300 is selected. For example, the first filter 200 is selected, and then from a high-frequency signal that has passed through the first passband, incoming data can be generated. However, in a case where disturbing signals 607 having a signal level higher than the signal level of the signal 601 and having a frequency included in the first passband are present, the signal 601 cannot be received. This is because the disturbing signals 607 pass through the first filter 200 and the bandpass filter #1 (433) downstream thereof.

Therefore, by selecting the second filter 300 and generating incoming data from a high-frequency signal that has passed through the second passband, the signal 601 can be received. This is because the frequency of the disturbing signals 607 is not included in the second passband, and thus the disturbing signals 607 are attenuated by the second filter 300. "b" in the figure represents the state in which the disturbing signals 607 are attenuated. The detector 460 described in FIG. 1 detects the disturbing signals that have passed through the first passband and been demodulated after the first filter 200 is selected. The selector 440 selects the second filter 300 based on the detection result, so that the disturbing signals 607 can be attenuated, and the signal 601 can be received. Accordingly, the disturbing signal resistance or the reception performance of the receiving apparatus 10 can be improved.

Reception Processing

Figure 5:
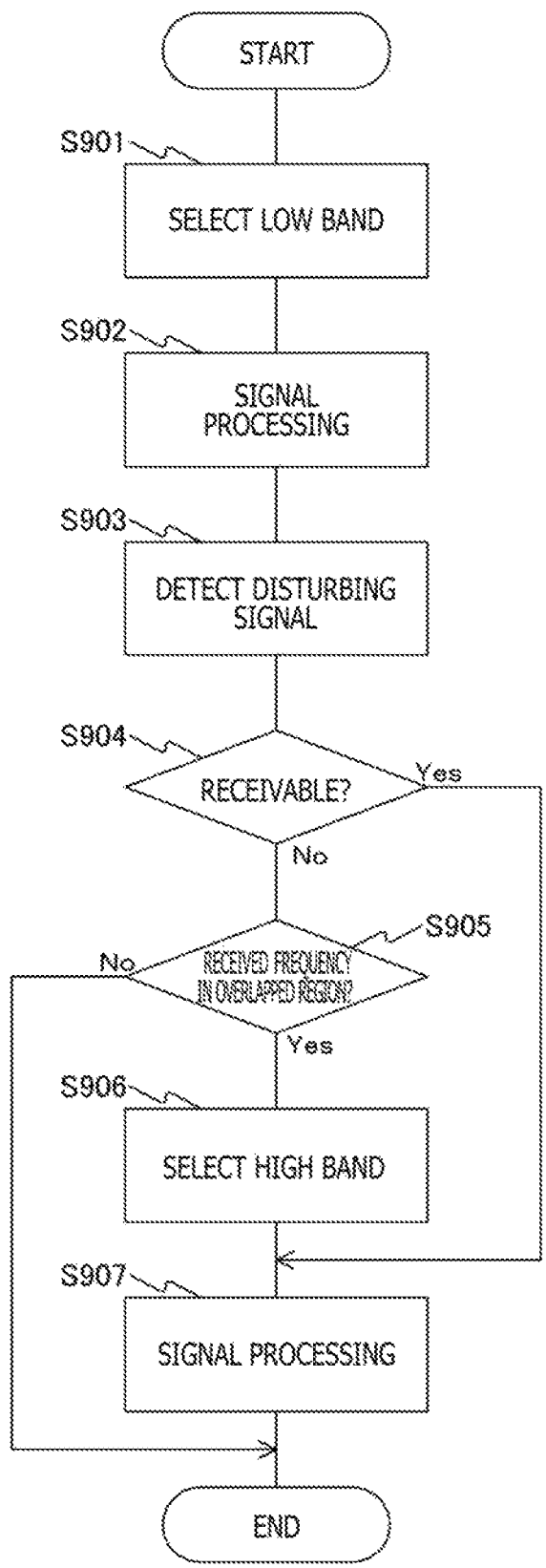
FIG. 5 is a chart illustrating an example of a processing procedure of a reception processing according to the embodiment of the present technique.

FIG. 5 is a chart illustrating an example of a processing procedure of the reception processing according to the embodiment of the present technique. A desired broadcast channel is selected by a user or the like, and selection of a low band or a high band is made. This is performed by a controller (not illustrated in FIG. 1) configured to control the entire receiving apparatus 10. Examples of the controller which can be used here include a microcomputer and a hardware sequencer. In the figure, it is assumed that the low band is selected (Step S901). In other words, it is assumed that the first passband is selected. Accordingly, the signal processing is performed for a high-frequency signal input via the first filter 200 and the low noise amplifier #1 (410) (Step S902). This is achieved by conversion of a high-frequency signal into a signal having a baseband frequency by way of the variable gain amplifier #1 (431), the bandpass filter #1 (433), and the mixer 435 and demodulation in the demodulator 450. Next, the detector 460 detects a disturbing signal (Step S903). Next, based on the detected disturbing signal, whether or not the desired broadcast channel is receivable is determined (Step S904).

In a case where it is receivable (Yes in Step S904), the procedure goes to processing in Step S907. In a case where it is not receivable (No in Step S904), whether or not a received frequency is included in an overlapped region is determined (Step S905). This is achieved by determination whether or not the desired broadcast channel is included in a frequency domain where the first and second passbands overlap with each other. This determination can be performed, for example, by the controller described above. Alternatively, the determination can be performed by the selector 440. Consequently, in a case where the received signal is not included in the overlapped region (No in Step S905), the reception processing is ended.

On the other hand, in a case where the received signal is included in the overlapped region (Yes in Step S905), the selector 440 selects the high band (Step S906). Accordingly, the signal processing is performed for a high-frequency signal input via the second filter 300 and the low noise amplifier #2 (420) (Step S907). This is executed by the variable gain amplifier #2 (432), the bandpass filter #2 (434), the mixer 436, and the demodulator 450. Thereafter, this signal processing is executed continuously until another channel is selected by the user or the like.

In this manner, according to the first embodiment of the present technique, one of the first filter 200 and the second filter 300 having passbands overlapping with each other is selected according to the signal level of the disturbing signal and a signal is received therethrough. Accordingly, the selected filter can attenuate the disturbing signal, and thus the reception performance can be improved.

Modification

According to the first embodiment described above, a signal received by the antenna 100 is separated into two bands, that is, the low band and the high band. However, the number of bands is not limited and, for example, the signal processing may be performed after separating the signal into three bands. This is because the bandwidth of the filter and the amplifier for each band can be narrowed, and thus the range of choice can be improved. A modification of the first embodiment of the present technique is different from the first embodiment described above in that three filters having different passbands are used.

Figure 6:
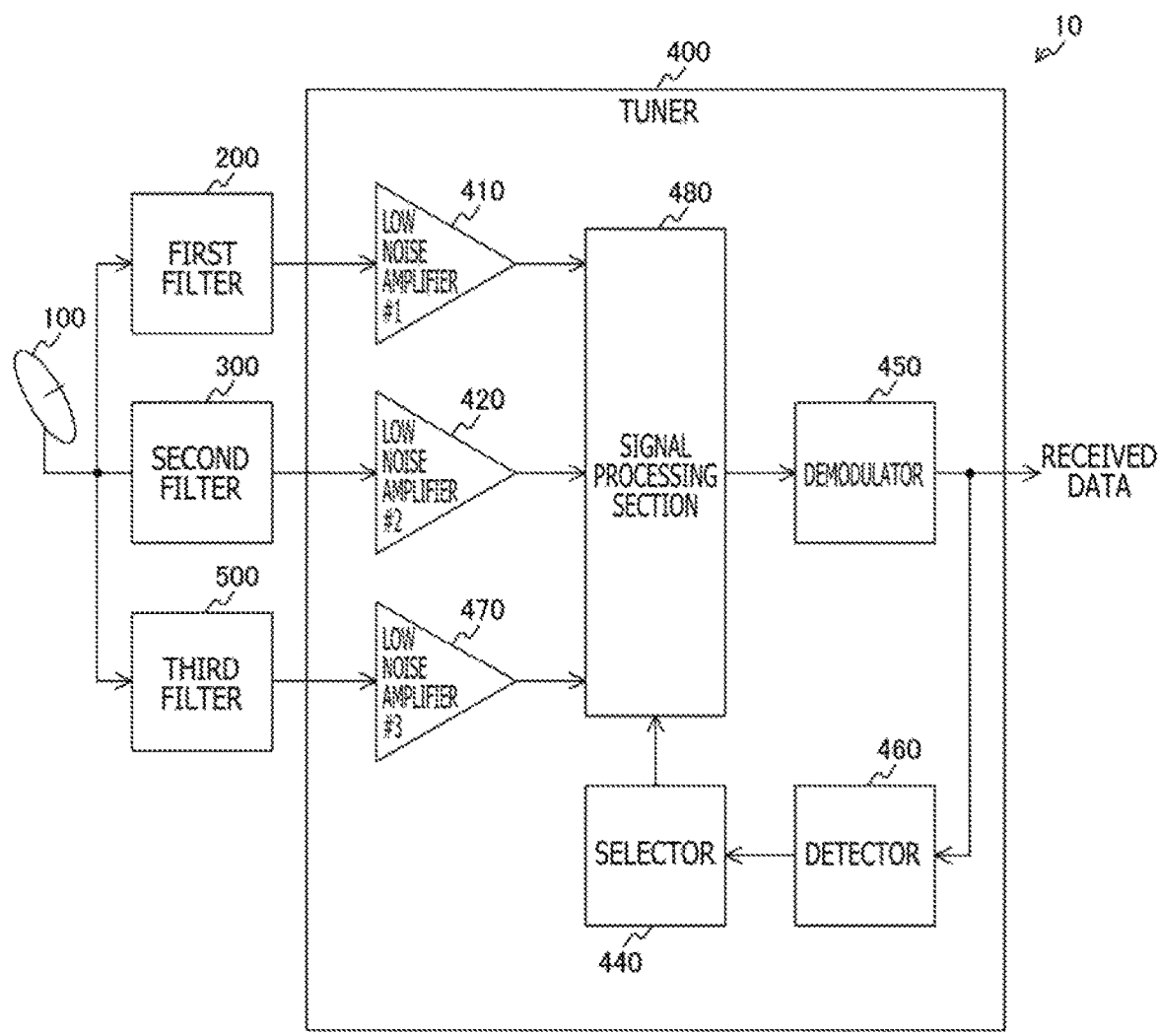
FIG. 6 is a diagram illustrating a configuration example of the receiving apparatus 10 according to a modification of the first embodiment of the present technique.

FIG. 6 is a diagram illustrating a configuration example of the receiving apparatus 10 according to the modification of the first embodiment of the present technique. The receiving apparatus 10 is different from the receiving apparatus 10 described with reference to FIG. 1 in that a third filter 500 is further provided. Also, the tuner 400 in the figure is different from the tuner 400 described with reference to FIG. 1 in that a signal processing section 480 is provided instead of the signal processing section 430 and a low noise amplifier #3 (470) is additionally provided.

The third filter 500 is a filter having a passband in an intermediate band between the first filter 200 and the second filter 300. Further, the low noise amplifier #3 (470) of the tuner 400 is an amplifier having a bandwidth corresponding to the passband of the third filter 500. Further, the signal processing section 480 selects one of high-frequency signals output from the low noise amplifier #1 (410), the low noise amplifier #2 (420), and the low noise amplifier #3 (470), and performs the signal processing.

First Passband, Second Passband, and Third Passband

Figure 7:
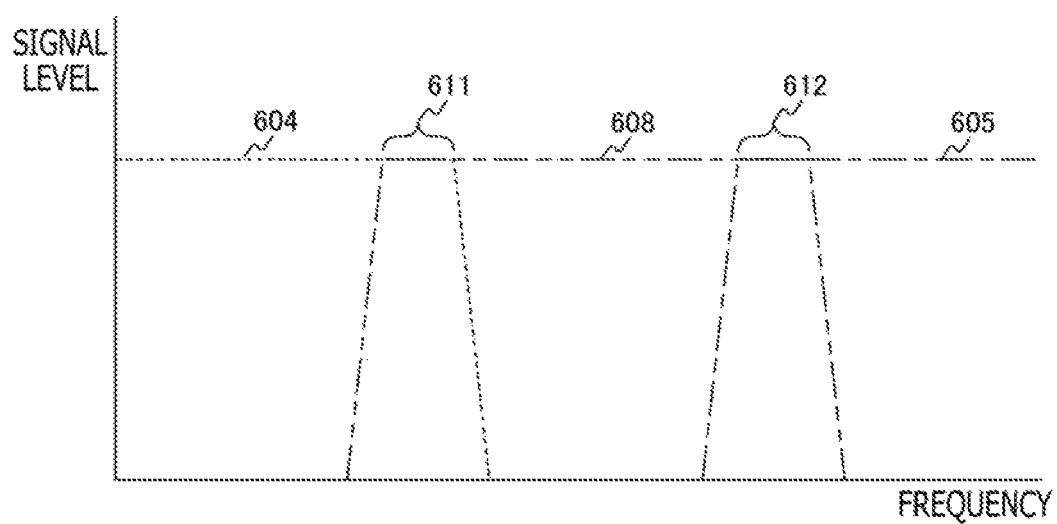
FIG. 7 is a graph illustrating an example of passbands of the first filter 200, the second filter 300, and a third filter 500 according to the modification of the first embodiment of the present technique.

FIG. 7 is a graph illustrating an example of passbands of the first filter 200, the second filter 300, and the third filter 500 according to the modification of the first embodiment of the present technique. In the figure, a two-dot chain line represents a passband 608 in the third filter 500. Note that, similarly to FIGS. 4A and 4B, a dotted line represents the passband 604 in the first filter 200, and a one-dot chain line represents the passband 605 in the second filter 300. In this manner, in the modification of the first embodiment of the present technique, the passbands of the first filter 200 and the second filter 300 are moved to a lower frequency side and a higher frequency side, respectively, and the third filter 500 having a passband in a band therebetween is provided. Here, the bands of the first filter 200 and the third filter 500 overlap with each other in a region 611. Also, the bands of the third filter 500 and the second filter 300 overlap with each other in a region 612.

The configuration of the receiving apparatus 10 other than that described above is similar to that of the receiving apparatus 10 in the first embodiment of the present technique, and thus description will be omitted.

In this manner, according to the modification of the first embodiment of the present technique, a received signal is divided into three bands for signal processing. Therefore, the bandwidth of the filter and the amplifier in each band can be reduced, and thus the range of choice can be improved.

2. Second Embodiment

In the first embodiment described above, a disturbing signal is detected after the signal processing and demodulation are performed. In contrast, a disturbing signal included in a high-frequency signal which is not subjected to the signal processing yet may be detected. This aims at improving detection accuracy for the disturbing signal. The second embodiment of the present technique is different from the first embodiment described above in that a disturbing signal included in a high-frequency signal which is not subjected to the signal processing yet is detected.

Configuration of Receiving Apparatus

Figure 8:
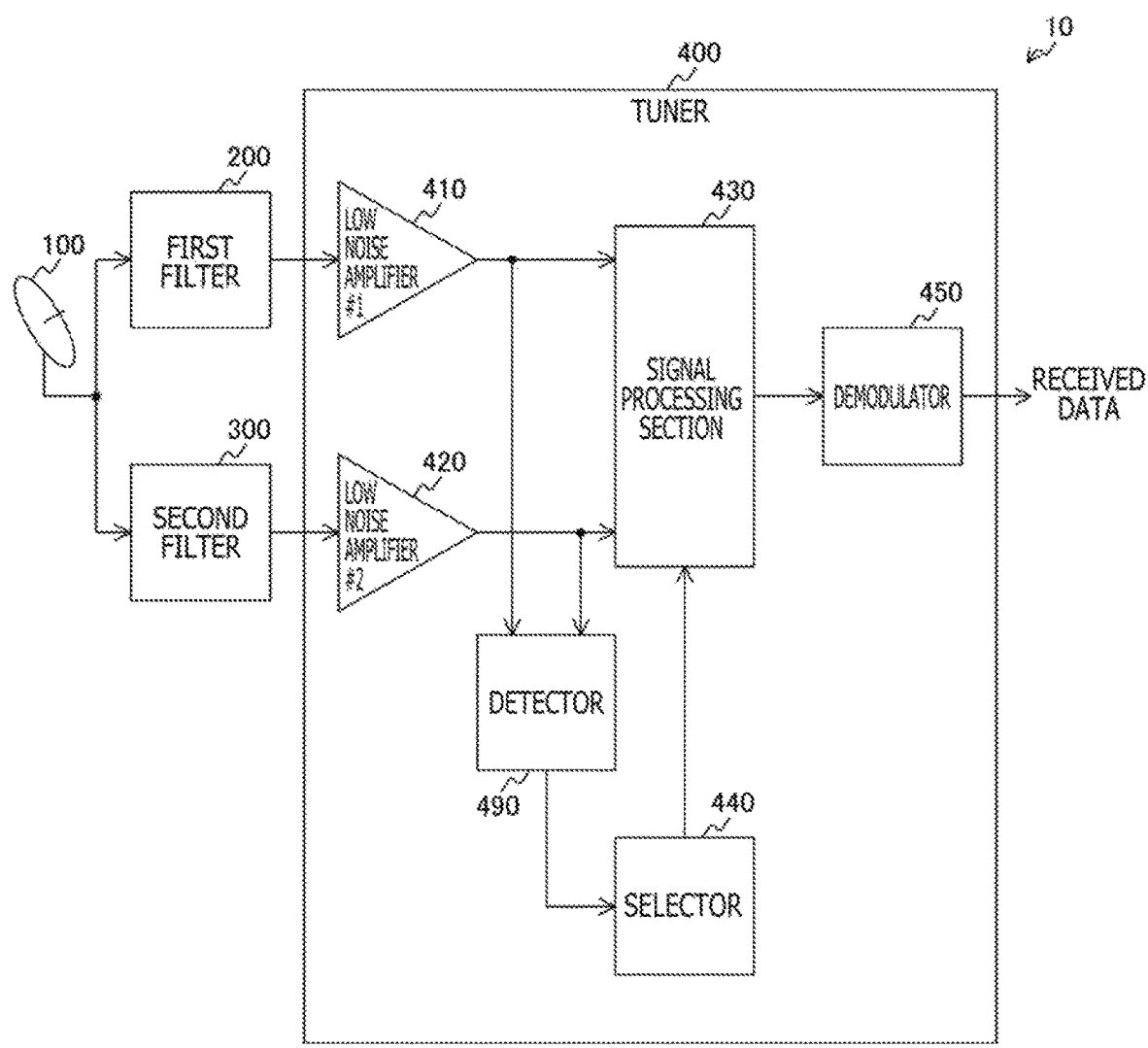
FIG. 8 is a diagram illustrating a configuration example of the receiving apparatus 10 according to a second embodiment of the present technique.

FIG. 8 is a diagram illustrating a configuration example of the receiving apparatus 10 according to the second embodiment of the present technique. The tuner 400 in the figure is different from the tuner 400 described with reference to FIG. 1 in that a detector 490 is provided instead of the detector 460.

The detector 490 is different from the detector 460 described with reference to FIG. 1 in that a disturbing signal included in a high-frequency signal that has passed through the low noise amplifier #1 (410) and the low noise amplifier #2 (420) is detected.

Configuration of Detector

Figure 9:
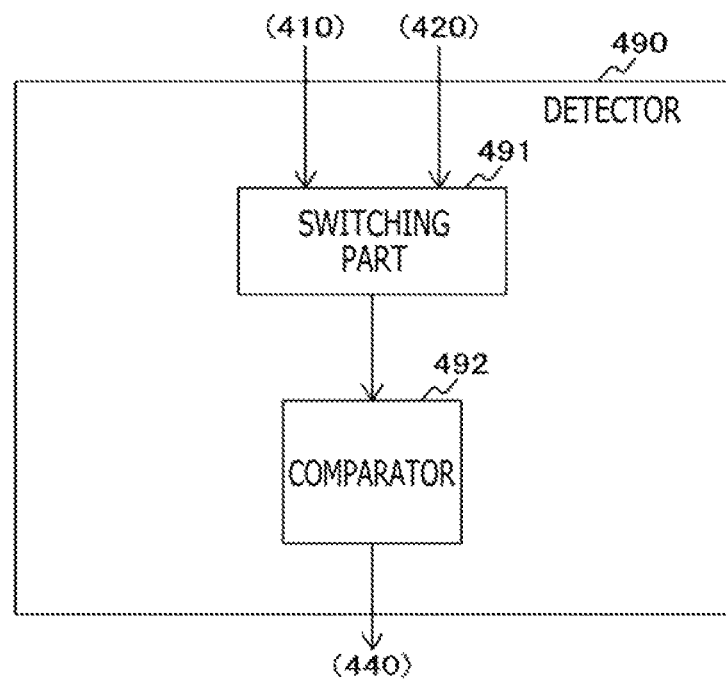
FIG. 9 is a diagram illustrating a configuration example of a detector 490 according to the second embodiment of the present technique.

FIG. 9 is a diagram illustrating a configuration example of the detector 490 according to the second embodiment of the present technique. The detector 490 includes a switching part 491 and a comparator 492.

The switching part 491 switches an output between the low noise amplifier #1 (410) and the low noise amplifier #2 (420), selects a high-frequency signal to be output from the selected amplifier, and outputs the selected high-frequency signal to the comparator 492.

The comparator 492 compares the high-frequency signal output from the switching part 491 with a predetermined threshold value, and outputs a result of the comparison. Examples of the predetermined threshold value that can be used include a signal having a voltage corresponding to a signal level of a disturbing signal to be detected. Specifically, in the receiving apparatus 10, a voltage corresponding to a signal level of a disturbing signal, which disables reception of a signal from the broadcast channel, can be determined as the predetermined threshold value. The comparator 492 outputs a value "0" in a case where the signal level of the high-frequency signal output from the switching part 491 is smaller than the predetermined threshold value, and outputs a value "1" in a case where the signal level of the high-frequency signal exceeds the predetermined threshold value. In other word, in a case where the high-frequency signal output from the switching part 491 is larger in signal level than the detected disturbing signal, a value "1" is output to the selector 440. Examples of the comparator 492 which can be used here include a comparator that performs comparison of analog signals. In contrast, since the detector 460 described with reference to FIG. 1 detects the disturbing signal by performing digital signal processing on the received signal after demodulation, the disturbing signal cannot be detected directly. In this manner, since the detector 490 in the figure detects the disturbing signal directly by the comparator 492, detection accuracy can be improved.

Note that the configuration of the receiving apparatus 10 in the second embodiment of the present technique is not limited to this example. For example, a configuration in which the tuner 400 further includes the detector 460 described with reference to FIG. 1 is also applicable. In this case, the selector 440 selects one of the first filter 200 or the second filter 300 according to the results of detection from the detectors 460 and 490. For example, in a case where the detectors 460 and 490 detect a disturbing signal simultaneously, the selector 440 can determine that a disturbing signal is present in that band, and can select another filter (band). Accordingly, detection accuracy of the disturbing signal can further be improved. Alternatively, for example, in a case where one of the detector 460 or the detector 490 detects a disturbing signal, the selector 440 can determine that a disturbing signal is present in that band. In such a case, detection of the disturbing signal in accordance with a detection performance of each of the detectors 460 and 490 can be performed.

The configuration of the receiving apparatus 10 other than that described above is similar to that of the receiving apparatus 10 in the first embodiment of the present technique, and thus description will be omitted.

In this manner, according to the second embodiment of the present technique, since a disturbing signal included in a high-frequency signal which is not subjected to the signal processing yet is directly detected by the comparator 492, detection accuracy of the disturbing signal can be improved.

Note that the embodiments described above are examples only for embodying the present technique, and the matters in the embodiments and specific matters of the invention in the claims individually have corresponding relations. Similarly, the specific matters of the invention in the claims and matters in the embodiments of the present technique to which same names as those in the claims are applied individually have corresponding relations. However, the present technique is not limited to the embodiments, and can be embodied by applying various modifications to the embodiments without departing the gist of the present technique.

In addition, a processing procedure described in the embodiments given above may be understood to be a method having these series of steps, and may also be understood to be a program for making a computer execute these series of steps or a recording medium that stores such a program. Examples of the recording medium which can be used here include a CD (Compact Disc), an MD (MiniDisc), a DVD (Digital Versatile Disc), a memory card, and a Blu-ray disc (Blu-ray (registered trademark) Disc).

Note that the advantageous effects described in this specification are merely examples, and are not limitative. Other advantageous effects may also be achieved.

Note that the present technique can have the following configuration.

(1) A receiving apparatus including:
a first filter configured to allow a received signal to pass in a first passband;
a second filter configured to allow a received signal to pass in a second passband having a band partly overlapping with that of the first passband;
a detector configured to detect a disturbing signal included in the received signal passed through one of the first filter or the second filter;
a selector configured to select one of the first filter or the second filter according to a signal level of the detected disturbing signal; and
a signal processing section configured to perform processing on the received signal passed through the selected filter.

(2) The receiving apparatus according to (1) described above, in which the detector detects the received signal having a signal level larger than a predetermined threshold value as the disturbing signal.

(3) The receiving apparatus according to (1) described above, in which the detector detects the disturbing signal included in the received signal after the processing.

(4) The receiving apparatus according to any one of (1) to (3), in which the signal processing section performs frequency conversion of the received signal as the processing.

(5) A receiving method including:
a detecting step of detecting a disturbing signal included in a received signal passed through one of a first filter or a second filter, the first filter allowing a received signal to pass in a first passband, the second filter allowing a received signal to pass in a second passband having a band partly overlapping with that of the first passband;
a selecting step of selecting one of the first filter or the second filter according to the detected disturbing signal; and
a signal processing step of performing processing on the received signal passed through the selected filter.

REFERENCE SIGNS LIST

10 Receiving apparatus
100 Antenna
200 First filter
300 Second filter
400 Tuner
410, 420, 470 Low noise amplifier
430, 480 Signal processing section
431, 432 Variable gain amplifier
435, 436 Mixer

433, 434 Bandpass filter
437 Low pass filter
438 Baseband amplifier
439 Local transmitter
440 Selector
450 Demodulator
460, 490 Detector
491 Switching part
492 Comparator
500 Third filter

The invention claimed is:

1. A receiving apparatus, comprising:
a first filter configured to allow a first signal to pass in a first passband;
a second filter configured to allow a second signal to pass in a second passband;
wherein a band of the first passband partly overlaps with a band of the second passband;
a first low noise amplifier configured to amplify the first signal passed through the first filter;
a second low noise amplifier configured to amplify the second signal passed through the second filter;
a detector configured to detect a disturbing signal in one of the first signal passed through the first filter or the second signal passed through the second filter;
a signal processing section; and
a selector configured to control the signal processing section to select one of a first output from the first low noise amplifier or a second output from the second low noise amplifier, wherein
the selection is based on a signal level of the detected disturbing signal, and
the signal processing section is configured to process the selected one of the first output or the second output.

2. The receiving apparatus according to claim 1, wherein the detector is further configured to detect the one of the first signal passed through the first filter or the second signal passed through the second filter as the disturbing signal based on a signal level of the one of the first signal or the second signal that is larger than a specific threshold value.

3. The receiving apparatus according to claim 1, wherein the detector is further configured to detect the disturbing signal in the one of the first signal or the second signal after the process of the selected one of the first output or the second output.

4. The receiving apparatus according to claim 1, wherein the process of the selected one of the first output or the second output, by the signal processing section, corresponds to frequency conversion of the selected one of the first output or the second output.

5. A receiving method, comprising:
allowing, by a first filter, a first signal to pass in a first passband;
allowing, by a second filter, a second signal to pass in a second passband,
wherein a band of the first passband partly overlaps with a band of the second passband;
amplifying, by a first low noise amplifier, the first signal passed through the first filter;
amplifying, by a second low noise amplifier, the second signal passed through the second filter;
detecting, by a detector, a disturbing signal in one of the first signal or the second signal;
controlling, by a selector, a signal processing section to select one of a first output from the first low noise amplifier or a second output from the second low noise amplifier,
wherein the selection is based on a signal level of the detected disturbing signal; and
processing, by the signal processing section, the selected one of the first output or the second output.

6. The receiving apparatus according to claim 1, further comprising a demodulator configured to demodulate an output signal from the signal processing section.

* * * * *